Patented May 18, 1926.

1,584,907

UNITED STATES PATENT OFFICE.

RALF B. TRUSLER, OF DORMONT, PENNSYLVANIA, ASSIGNOR TO THE ROESSLER & HASSLACHER CHEMICAL COMPANY, OF NEW YORK, N. Y., A CORPORATION OF NEW YORK.

PRODUCTION OF ESTERS FROM AMIDE ACID SULPHATES.

No Drawing.    Application filed July 22, 1925.   Serial No. 45,385.

The usual methods of producing esters of organic acids generally consist of causing an alcohol to be acted upon by,—
(1) An organic acid.
(2) An organic acid in the presence of a dehydrating agent.
(3) A salt of an organic acid in the presence of a mineral acid.
(4) An anhydride of an organic acid.
(5) An acyl chloride of an organic acid.
These methods are all subject to certain restrictions. In cases 1, 2, and 3 the reaction yielding the ester is hindered from going to completion on account of the water formed by the reaction, which establishes an equilibrium between the ester sought and the components used. In some instances, the dehydrating agent or the mineral acid actually decomposes either the organic acid or the alcohol used. The use of the anhydride of an acid (Case 4) is limited to such acids that form anhydrides that will esterify alcohol. In Case 5, the production of esters from acyl halide derivatives of organic acids is restricted to such acids that can be converted to the acyl halide form without decomposition. Furthermore, there are other restrictions that render methods 2, 3, 4, and 5 undesirable in esterifying unsaturated alcohols in that unsaturated alcohols may be attacked and totally altered by the presence of a condensing medium or of a mineral acid.

I have discovered a new method for making esters from alcohols wherein an alcohol is caused to react with an amide acid sulphate, producing an ester of an acid corresponding to the acid amide used and producing as a by-product, ammonium acid sulphate. The material and method of production of the new class of compounds, the amide acid sulphates, which are used in the new processes described herein, are fully disclosed in my copending application of even date, "the hydrolysis of nitriles". This process of esterification is illustrated by the equation.

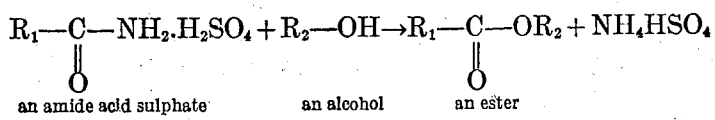

$$R_1-\underset{\underset{O}{\|}}{C}-NH_2.H_2SO_4 + R_2-OH \rightarrow R_1-\underset{\underset{O}{\|}}{C}-OR_2 + NH_4HSO_4$$
an amide acid sulphate      an alcohol      an ester Where $R_1$ may stand for any monovalent aliphatic, cyclic or aromatic group or derivative thereof, and $R_2$ may be similar or dissimilar to $R_1$ with the exception that $R_2$ cannot represent the class of compounds known as phenols in which case the point of esterification is the hydroxyl group (—OH) which is then attached to the phenyl or homologous radical.

I have found that, in general, all amide acid sulphates, as defined above, respond to this process of esterification, and furthermore that the alcohol employed may be saturated or unsaturated, and that the alcohol may contain one or more hydroxyl groups, one or more of which may be separately or simultaneously esterified.

By this process of making esters, no water of reaction is involved, as illustrated by the equation above, and hence there is no stage of incomplete reaction due to water of reaction.

To illustrate my discovery I give the following examples.

*Example I.*

One mole of formamide acid sulphate weighing about 143.1 grams is covered with one mol of ethyl alcohol weighing about 46.06 grams. The reactants should be cooled to prevent too rapid reaction, and the container should be provided with a reflux condenser, to prevent loss of any of the components involved in the reaction. Usually the reaction begins within a short time after the addition of the alcohol, and to insure complete esterification the mixture may be warmed to about 50° C. after the first spontaneous reaction is over. The reaction product is then warmed to distill off the ethyl formate which is collected in a suitable apparatus. There remains behind as a by-product of the reaction a residue of ammonium acid sulphate. The course of the reaction is illustrated by the equation,—

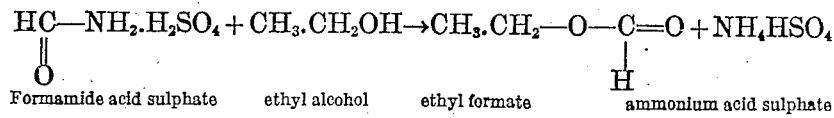

Formamide acid sulphate     ethyl alcohol     ethyl formate     ammonium acid sulphate The ethyl formate may be purified by known means, such as fractionation. A nearly quantitative yield of ethyl formate boiling between 54° and 55° C. at 760 mm. pressure is obtained.

I do not wish to limit this process to the amount of alcohol just recommended for it has often been found advantageous to use alcohol in excess of molar proportions to allow smoother control of the reaction and to aid the recovery of the ester. Neither do I wish to restrict the process to the method of procedure and the temperature given, for I have found that variations in either case can be made to suit the type of apparatus used in conducting this synthesis.

*Example II.*

An unsaturated alcohol may be converted into an ester in a manner similar to example No. 1. One mol of allyl alcohol weighing about 58 grams is mixed with one mol of formamide acid sulphate weighing about 143.1 grams. The reactants are then permitted to react in the cold for about an hour and then warmed to about 60° to insure complete reaction. The liquid portion consisting mainly of allyl formate is removed from the ammonium acid sulphate by-product by distillation. A high yield of allyl formate boiling between 83.2 and 84° C. at 760 mm. pressure is obtained from the distillate. The reaction taking place between formamide acid sulphate and allyl alcohol is illustrated by the equation.

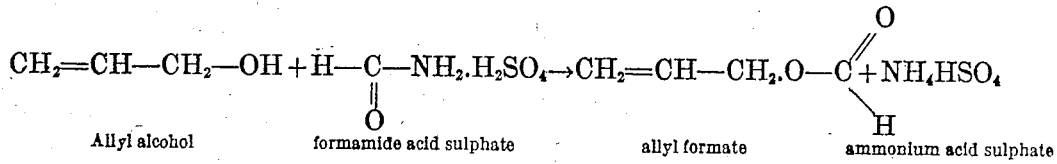

Allyl alcohol     formamide acid sulphate     allyl formate     ammonium acid sulphate

*Example III.*

One mol of benzyl alcohol weighing about 108.1 grams and one mol of acetamide acid sulphate weighing about 157.1 grams are mixed and then warmed to about 70° C. or 80° C. for ten hours. The reaction yields mainly benzyl acetate and ammonium acid sulphate according to the equation (Φ represents the benzene nucleus).

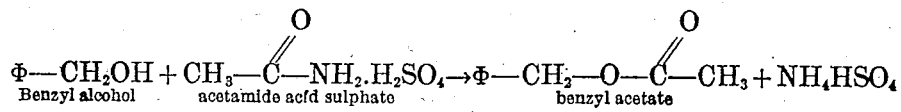

Benzyl alcohol     acetamide acid sulphate     benzyl acetate

After the reaction is completed the mixture of principally benzyl acetate and ammonium acid sulphate is washed with ice water to remove the soluble by-products, then with a dilute solution of sodium bicarbonate, then dried, and finally distilled. The distillate so obtained is essentially benzyl acetate, boiling at 215° to 216° C. at 760 mm. pressure.

*Example IV.*

One mol of propyl alcohol weighing about 60.1 grams and one mol of benzamide acid sulphate weighing about 121.1 grams are mixed and then heated up to 90–95° C., and maintained at this temperature for about six hours. The two compounds are caused to react and produce propyl benzoate and ammonium acid sulphate, as illustrated by the equation.

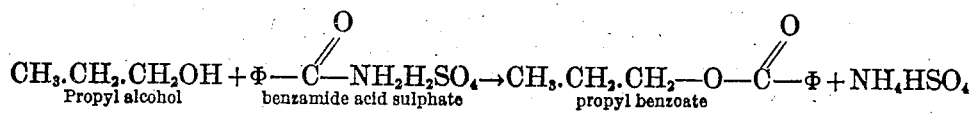

Propyl alcohol     benzamide acid sulphate     propyl benzoate

The propyl benzoate is recovered by washing the reaction product with cold water to remove water soluble substances, then with a dilute solution of sodium bicarbonate, then dried, and finally distilled.

The distillate consists essentially of propyl benzoate boiling at 229.1° to 230.2° C. at 740 mm. pressure. (Corrected point appears to be 230–231° at 760 mm. pressure.)

*Example V.*

Two mols of formamide acid sulphate weighing about 286.2 grams and one mol of ethylene glycol weighing about 62 grams are mixed with stirring and cooling, and then warmed to 80° with stirring, for two hours. The reaction mixture is cooled, and then diluted with 50 c. c. of ether. The entire mixture is then centrifuged to separate the liquid portion from the by-products, ammonium acid sulphate. The liquid portion is distilled at atmospheric pressure to remove most of the ether, and then fractionated at reduced pressure. The reaction between one mol of glycol and two mols of formamide acid sulphate yields the ester, glycol diformate as illustrated by the equation.

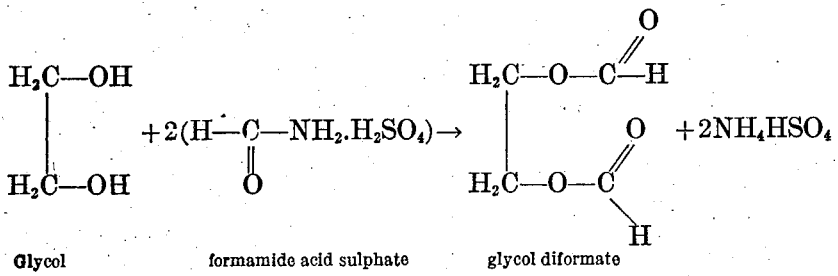

Glycol      formamide acid sulphate      glycol diformate

The glycol diformate was found to boil between 69–71° C. at 8.5 mm. pressure.

I do not wish to be limited either to the time given for the reaction nor to the temperatures recommended for it is understood that in all of the processes time and temperature may be largely varied if desired.

*Example VI.*

One mol of glycol, $HO-CH_2-CH_2OH$, is reacted as above with one mol of formamide acid sulphate. From this reaction is recovered one mol of ammonium acid sulphate and a colorless, nearly odorless liquid. This liquid hydrolyses readily in water into formic acid and glycol showing it to be glycol monoformate.

*Example VII.*

Proceeding as in Example V one mol of formamide acid sulphate can be reacted with one mol glycerol with the recovery of one mol of ammonium acid sulphate and a colorless liquid, the monoformate.

*Example VIII.*

Two mols of formamide acid sulphate when reacted as in Example VII from two mols of the ammonium acid sulphate and a colorless liquid mixture containing the diformate derivative.

Claims.

1. Method of manufacture of esters of organic acids which consists in reacting an amide acid sulphate with an organic compound containing an hydroxyl group attached to a noncyclic carbon atom.

2. Method of manufacture of esters of organic acids which consists in reacting an alcohol with an amide acid sulphate.

3. Method of manufacture of esters of organic acids which consists in reacting an alipathic alcohol with an amide acid sulphate.

4. Method of manufacture of esters of organic acids which consists in reacting a primary alcohol with an amide acid sulphate.

5. Method of manufacture of esters of organic acids which consists in reacting a monohydric alcohol with an amide acid sulphate.

6. Method of manufacture of ethyl formate which consists in causing ethyl alcohol to react with formamide acid sulphate.

Signed at Pittsburgh, Pa., in the county of Allegheny and State of Pennsylvania this 14th day of July A. D. 1925.

RALF B. TRUSLER.